United States Patent Office 3,598,723
Patented Aug. 10, 1971

3,598,723
HYDROCARBON HYDROPROCESSING
Richard E. Rausch, Mundelein, Ill., assignor to Universal Oil Products Company, Des Plaines, Ill.
No Drawing. Continuation-in-part of application Ser. No. 825,084, May 15, 1969. This application June 30, 1969, Ser. No. 837,924
Int. Cl. C10g *13/02*
U.S. Cl. 208—111                                8 Claims

ABSTRACT OF THE DISCLOSURE

A process for hydrotreating (hydroprocessing) hydrocarbons and mixtures of hydrocarbons utilizing a catalytic composite of a porous carrier material, a rhenium component and a tin component, in which process the chemical consumption of hydrogen is effected. A specific example of one such catalyst is a composite of a crystalline aluminosilicate, particularly faujasite, a rhenium component, and a tin component. Specific hydroprocesses are directed toward the hydrogenation of aromatic nuclei, hydrocracking, the ring-opening of cyclic hydrocarbons, desulfurization, denitrification and hydrogenation.

RELATED APPLICATION

The present application is a continuation-in-part of my copending application, Ser. No. 825,084, filed May 15, 1969, all the teachings of which copending application are incorporated herein by specific reference thereto.

APPLICABILITY OF INVENTION

The present invention encompasses the use of a catalytic composite of a porous carrier material, a rhenium component and a tin component in the hydrotreating of hydrocarbons and mixtures of hydrocarbons. As utilized herein, the term "hydrotreating" is intended to be synonymous with the term "hydroprocessing," and involves the conversion of hydrocarbons at such operating conditions as will effect a chemical consumption of hydrogen. Included within the processes intended to be encompassed by the term "hydroprocessing" are hydrocracking, aromatic hydrogenation, ring-opening, hydrorefining (for nitrogen removal and olefin saturation), desulfurization (often included in hydrorefining), hydrogenation, etc. As will be recognized, one common attribute of these processes, and the reactions being effected therein, is that they are hydrogen-consuming and are, therefore, exothermic in nature. In employing the term, "hydroprocessing," it is intended to allude to a hydrocarbon conversion process wherein there exists a chemical consumption of hydrogen. It is further intended to exclude those conversion processes in which the hydrogen consumption is confined to the saturation of light olefins, resulting from undesirable cracking of charge stock and/or product components, resulting in the production of light gaseous waste material, principally methane, ethane and propane. The individual characteristics of the foregoing hydrocarbon hydroprocesses, including preferred operating conditions and techniques, will be hereinafter described in greater detail.

The present invention involves the use of a catalytic composite having exceptional activity and resistance to deactivation in a hydrogen-consuming, or hydrotreating process. The use of a particular dual-function catalytic composite enables substantial improvements in those hydroprocesses that have traditionally used a dual-function catalyst. The catalytic composite comprises a porous carrier material, a rhenium component and a tin component; specifically, an improved hydrocracking process is afforded through the use of a crystalline aluminosilicate carrier material, a rhenium component and a tin component, with the improvement being noted in activity, product selectivity and operational stability characteristics. Composites having dual-function catalytic activity are widely employed in many industries for the purpose of accelerating a wide spectrum of hydrocarbon conversion reactions. Generally, the cracking function is thought to be associated with an acid-acting material of the porous, adsorptive refractory inorganic oxide type utilized as the carrier material for one or more metallic components including the metals, or compounds of metals from Groups V through VIII of the Periodic Table, to which the hydrogenation function is generally attributed.

Catalytic composites are used to promote a wide variety of hydrocarbon conversion reactions such as hydrocracking, isomerization, dehydrogenation, hydrogenation, desulfurization, ring-opening, catalytic reforming, cyclization, aromatization alkylation, polymerization, cracking, etc., some of which reactions are hydrogen-producing, while others are hydrogen-consuming. It is to the latter group of reactions, hydrogen-consuming, that the present invention is applicable. In many instances, the commercial application of these catalysts resides in processes where more than one of the reactions proceed simultaneously. An example of this type of process is a hydrocracking process wherein dual-fuction catalysts are utilized to effect selective hydrogenation and cracking of high molecular weight materials to produce lower-boiling, more valuable product streams. Another such example would be the conversion of aromatic hydrocarbons into jet fuel components, principally straight, or slightly branched-chain paraffins.

Regardless of the reaction involved, or the particular process, it is very important that the catalyst exhibit the capability (1) to perform its specified functions initially, and (2) to perform them satisfactorily for a prolonged period of time. The analytical terms employed in the art to measure how efficient a particular catalyst performs its intended functions, in a particular hydrocarbon conversion process, are activity, selectivity and stability. With respect to a hydrogen-consuming hydrocracking process, "activity" connotes the quantity of charge stock, boiling above a given temperature, which is converted to hydrocarbons boiling below the given temperature. "Selectivity" refers to the quantity of converted charge stock which boils below the desired end point of the product, as well as above a minimum specified initial boiling point. "Stability" connotes the rate of change of activity and stability. Thus, for example, where a gas oil boiling above about 650° F., is subjected to hydrocracking, "activity" alludes to the conversion of 650° F.-minus product. "Selectivity" can allude to the degree of conversion into gasoline boiling range hydrocarbons i.e. pentanes and heavier, normally liquid hydrocarbons boiling up to about 400° F. "Stability" might be conveniently expressed in terms of temperature increase required during various increments of catalyst life, in order to maintain the desired activity and selectivity.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions are such that the formation of high molecular weight, black, solid or semi-solid, hydrogen-poor carbonaceous material is effected. This coats the surface of the catalyst and reduces its activity by shielding the active sites from the reactants. In other words, the performance of dual-function catalysts is sensitive to the presence of carbonaceous deposits on the surface thereof. Accordingly, a major problem facing workers in this area is the development of more active and selective catalytic composites that are not as sensitive to the presence of these carbonaceous materials, and/or have the capability to suppress the rate of formation thereof at the operating conditions employed in a particular process utilizing a particular type of feed stock.

One who is cognizant of petroleum refining processes and techniques, will recognize that a dual-function catalyst having superior characteristics of activity, selectivity and stability contains a Group VIII noble metal component. This type of catalyst has been widely used in processes such as hydroisomerization, dehydrogenation, dehydrocyclization, hydrocracking, catalytic reforming, and the like. This catalyst has achieved a dominant position in the art despite the fact that its principal ingredient, for example platinum, is an extremely expensive metal in relatively short supply and has demonstrated a history of ever-increasing cost. The economic picture, with respect to Group VIII noble metal-containing catalyst has served as a powerful incentive for broad ranging investigations directed at finding an acceptable alternative to the noble metal for use in processes for hydrocarbon conversion. One such alternative, prominently mentioned in the literature, is rhenium. However, extensive investigations conducted with catalytic composites comprising a rhenium component combined with a porous carrier material have conclusively established that rhenium alone does not provide a suitable alternative to platinum in dual-function hydrocarbon conversion catalysts. For instance, the use of a catalyst comprising rhenium on various conventional carrier materials has established that this type of catalyst has an activity which is substantially less than the conventional noble metal-containing catalyst. As a result of my investigations of the effect of various metallic components on a rhenium-containing catalyst, I have now found a dual-function catalytic composite which possess improved activity, selectively and stability when employed in a process for the conversion of hydrocarbons and especially in a hydroprocess wherein there is effected a chemical consumption of hydrogen. In particular, I have found that the use of catalytic composite of a tin component and a rhenium component with a porous carrier material improves the overall operation of these hydrogen-consuming processes. Moreover, I have determined that a catalytic composite of a crystalline aluminosilicate carrier material, a rhenium component and a tin component, when utilized in a process for hydrocracking hydrocarbonaceous material into lower-boiling hydrocarbon products, affords substantial improvement in performance and results. As indicated, the present invention essentially involves the use of a catalyst in which a tin component has been added to a rhenium-containing, dual-function conversion catalyst which enables the performance characteristics of the process to be sharply and materially improved.

OBJECTS AND EMBODIMENTS

An object of the present invention is to afford a process for hydrotreating a hydrocarbon, or mixtures of hydrocarbons. The corollary objective is to improve the selectivity and stability of hydrocarbon hydroprocesses utilizing a highly active, tin component-containing catalytic composite.

A specific object of my invention resides in the improvement of hydrogen-consuming processes including hydrocracking, hydrorefining, ring-opening for jet fuel production, hydrogenation of aromatic hydrocarbons, desulfurization, denitrification, etc. Therefore, in one embodiment, the present invention relates to a process for hydrotreating a hydrocarbon which comprises reacting said hydrocarbon with hydrogen at hydrotreating conditions selected to effect the chemical consumption of hydrogen, and in contact with a catalytic composite of a rhenium component, a tin component and a porous carrier material. In another embodiment, the hydrotreating conditions include a pressure of from 500 to about 5,000 p.s.i.g., an LHSV of from 0.1 to about 10.0, a hydrogen concentration of from 3,000 to about 50,000 scf./bbl. and a maximum catalyst bed temperature of from 200° F. to about 900° F.

In a specific embodiment, the present invention involves a process for producing a cycloparaffinic hydrocarbon which comprises contacting hydrogen and an aromatic hydrocarbon in a reaction zone, at a catalyst temperature of from 200° F. to about 800° F. and a pressure of from 500 to about 2,000 p.s.i.g., in contact with a non-acidic catalytic composite containing 0.05% to about 3.0% by weight of a rhenium component, from about 0.05% to about 5.0% by weight of a tin component, and from about 0.10% to about 1.5% by weight of an alkalinous metal component, calculated as the elements, separating the resulting reaction zone effluent to provide a hydrogen-rich vaporous phase and to recover said cycloparaffinic hydrocarbon.

Another embodiment affords a hydrocracking catalyst comprising a substantially pure faujasite carrier material, at least about 90.0% by weight of which is zeolitic, a rhenium component and a tin component.

Other objects and embodiments of my invention relate to additional details regarding preferred catalytic ingredients, the concentration of components in the catalytic composite, methods of catalyst preparation, individual operating conditions for use in the various hydrocarbon hydroprocesses, preferred processing techniques and similar particulars which are hereinafter given in the following more detailed summary of my invention.

SUMMARY OF INVENTION

As hereinabove set forth, the present invention concerns the hydroprocessing of hydrocarbons and mixtures of hydrocarbons, utilizing a particular catalytic composite. This catalyst comprises a porous carrier material having combined therewith a rhenium component and a tin component; in many applications, the catalytic composite will also contain a halogen component, and, in some select applications, an alkali metal or alkaline-earth metal component. Considering first the porous carrier material, it is preferred that it be an absorptive, high-surface area support having a surface area of about 25 to about 500 square meters per gram. The porous carrier material is necessarily relatively refractory with respect to the operating conditions employed in the particular hydrocarbon hydroprocess, and it is intended to include those carrier materials which have traditionally been utilized in dual-function hydrocarbon conversion catalysts. In particular, suitable carrier materials are selected from the group of amorphous refractory inorganic oxides including alumina, titania, zirconia, chromina, magnesia, thoria, boria, silica-alumina, silica-magnesia, chromia-alumina, alumina-boria, alumina-silica-boron phosphate, silica-zirconia, etc. When of the amorphous refractory inorganic oxide type, a preferred carrier material constitutes a composite of alumina and silica, with silica being present in an amount of about 10.0% to about 90.0% by weight.

In many hydroprocessing applications of the present invention, particularly hydrocracking heavy hydrocarbonaceous material to produce lower-boiling hydrocarbon products, the carrier material will consist of a crystalline aluminosilicate. This may be naturally-occurring, or synthetically-prepared, and includes mordenite, faujasite, Type A or Type U molecular sieves, etc. When utilized as the carrier material, the zeolitic material may be in the hydrogen form, or in a form which has been treated with multi-valent cations.

As hereinabove set forth, the porous carrier material, for use in the process of the present invention, is a refractory inorganic oxide, either alumina in and of itself, or in combination with one or more other refractory inorganic oxides, and particularly in combination with silica. When utilized as the sole component of the carrier material, the alumina may be of the gamma-, eta-, or theta-alumina type, with gamma- or eta-alumina giving the better results. In addition, preferred carrier materials have an apparent bulk density of about 0.30 to about 0.70 grams per cc. and surface area characteristics indicating an average pore diameter of about 20 to about 300 Angstroms, a pore volume of about 0.10 to about 1.0 milliliters per gram and a surface area of about 100 to about 500 square meters per gram. Whatever type of refractory inorganic oxide is employed, it may be activated prior to use by one or more treatments including drying, calcination, steaming, etc. For example, an alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination is converted to alumina. The carrier material may be formed in any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or collodial silica, and sodium aluminate, and allow these solutions to react to form a solid crystalline aluminosilicate. Another method is to contact a solid inorganic oxide from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate. This stems from the fact that the method affords a carrier material of substantially pure crystalline aluminosilicate particles. In employing the term "substantially pure," the intended connotation is an aggregate particle at least 90.0% by weight of which is zeolitic. Thus, the carrier material is distinguished from an amorphous carrier material, or prior art pills and/or extrudates in which the zeolitic material might be dispersed within an amorphous matrix with the result that only about 40.0% to about 70.0% by weight of the final particle is zeolitic. The preferred method of preparing the carrier material produces crystalline aluminosilicates of the faujasite modification, and utilizes aqueous solutions of colloidal silica and sodium aluminate. Colloidal silica is a suspension in which the suspended particles are present in a very finely-divided form i.e. having a particle size from about one to about 500 millimicrons in diameter. There are many types of crystalline aluminosilicates which may be produced in a desired size and shape by this preferred method. The type which is produced is primarily dependent upon the conditions under which crystallization occurs, with the $SiO_2/Al_2O_3$ ratio, the $Na_2O/SiO_2$ ratio, the $H_2O/Na_2O$ ratio, temperature and time being the important variables.

After the solid crystalline aluminosilicate has been formed, the mother liquor is separated from the solids by methods including decantation, filtration, etc. The solids are water-washed and filtered to remove undesirable ions, and to reduce the quantity of amorphous material, and are then reslurried in water to a solids concentration of about 5.0% to about 50.0% by weight. The cake and water are then violently agitated and homogenized until the agglomerates are broken and the solids are uniformly dispersed in what appears to be a colloidal suspension. The suspension is then spray dried by conventional means, such as pressurizing the suspension through an orifice into a hot, dry chamber. The solid particles are withdrawn from the drying chamber and are suitable for forming into finished particles of a desired size and shape. The preferred form of the finished particle is a cylindrical pill, and these may be prepared by introducing the spray dried particles directly into a pilling machine without the addition of any extraneous lubricant or binder. The pilling machines are adjusted to produce particles having a crushing strength of from 2 to 20 pounds, and preferably from 5 to 15 pounds. The pilled faujasite carrier material, of which at least about 90.0% by weight is zeolitic, is activated catalytically by converting the sodium form either to the divalent form, the hydrogen form or mixtures thereof.

An essential constituent of the catalytic composite used in the hydrocarbon hydroprocessing scheme of the present invention is a tin component. It may be present as an elemental metal, or as a chemical compound such as the oxide, sulfide, halide, etc. Although the tin component can be used in relatively large amounts, it is generally present in an amount sufficient to result in a final catalytic composite containing, on an elemental basis, about 0.01% to about 20.4% by weight of tin, and preferably from about 0.05% to about 5.0% by weight. This component may be incorporated within the catalytic composite in any suitable manner such as by co-precipitation or co-gellation with the porous carrier material, ion-exchange with the carrier material or impregnation of the carrier material at any selected stage in the preparation thereof. It is intended to include all conventional methods for incorporating a metallic component in a catalytic composite, and the particular method of incorporation is not an essential feature of the process of the present invention. One convenient method involves co-precipitating the tin component during the preparation of the amorphous refractory oxide carrier material. When the carrier material is a crystalline aluminosilicate, the preferred technique involves impregnation with the tin component. In the co-precipitation technique, a suitable soluble, decomposable tin compound such as stannous or stannic halide is added to the inorganic oxide hydrosol, the hydrosol is combined with a suitable gelling agent and the mixture is dropped into an oil bath, for the formation thereof into substantially spherical particles. The formation of spherical particles is detailed in United States Pat. No. 2,620,-314, issued to James Hoekstra. Following a high-temperature calcination step, there is obtained a carrier material comprising an intimate combination of the refractory inorganic oxide and stannic oxide. The impregnation technique involves the utilization of a water-soluble compound of tin to impregnate the porous carrier material. Thus, the tin component may be added by commingling the carrier with an aqueous solution of a suitable tin salt or water-soluble compound of tin, such as stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride, is preferred since it facilitates the incorporation of a tin component and at least a minor amount of a halogen component, where desired, in a single step. In general, the tin component can be impregnated either prior to, simultaneously with, or after the rhenium component is added to the carrier material. It appears, however, that significantly improved processing results are obtained when the tin component is impregnated simultaneously with the rhenium component. It has been determined that a preferred impregnation solution contains perrhenic acid, hydrogen chloride, and stannous, or stannic chloride. Regardless of how the components of the catalyst are combined with the carrier material, the final composite will generally be dried at a temperature of about 200° F. to about 600° F., for a period of from 2 to about 24 hours or more, and finally calcined at a temperature of about 700° F. to about 100° F. in an atmosphere of air, for a period of about 0.5 to about 10 hours in order to convert the metallic components substantially to the oxide form. When the carrier material constitutes a crystalline aluminosilicate, it is preferred that the calcination temperature not exceed about 1,000° F.

Another essential component of the catalytic composite is a rhenium component. This component may also be present as an elemental metal, as a chemical compound such as the oxide, sulfide, halide, etc., or in a physical or chemical combination with the porous carrier material and/or other components of the catalytic composite. The rhenium component is usually utilized in an amount sufficient to result in a final catalytic composite containing about 0.01% to about 10.0% by weight of rhenium, calculated on an elemental basis, and preferably about 0.05% to about 3.0% by weight. The rhenium may be incorporated within the catalytic composite in any suitable manner, and during any selected stage in the preparation of the catalyst. It is generally advisable to incorporate the rhenium component by way of an impregnation step after the porous carrier material has been formed in order that the expensive metal will not be lost due to washing and purification techniques applied to the carrier material during the course of its preparation. Although any suitable method for incorporating a catalytic component into a porous carrier material can be utilized to incorporate the rhenium component, the preferred procedure involves impregnation of the porous carrier material. The impregnating solution can, in general, be a solution of a suitable soluble, decomposable rhenium salt such as ammonium perrhenate, sodium perrhenate, potassium perrhenate, and the like salts. In addition, solution of rhenium halides such as rhenium chloride, rhenium fluoride, etc., may be used, with the preferred impregnating solution being an aqueous solution of perrhenic acid. The porous carrier material can be impregnated with the rhenium component either prior to, simultaneously with, or after the other components herein mentioned have been combined therewith. Best results are ordinarily achieved when the rhenium component is impregnated simultaneously with the tin component. As previously stated, excellent results have been obtained with a one-step impregnation technique utilizing an aqueous solution of perrhenic acid, stannic chloride and hydrochloric acid.

Although not essential to successful hydroprocessing in all cases, in fact detrimental in some, it is preferred to incorporate a halogen component into the catalytic composite. Accordingly, one catalytic composite, for utilization in hydrocarbon hydroprocessing, comprises a combination of a tin component, a rhenium component and a halogen component. Although the precise form of the chemistry of the association of the halogen component with the carrier material and metallic components is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydrotreating processes encompassed by the present invention. The halogen may be added to the carrier material in any suitable manner, and either during preparation of the carrier, or before, or after the addition of the other components. For example, the halogen may be added at any stage in the preparation of the carrier material, or to the calcined carrier material, and in the form of an aqueous solution of an acid such as hydrogen fluoride, hydrogen chloride, hydrogen bromide, hydrogen iodide, etc. The halogen component or a portion thereof may be composited with the carrier material during the impregnation of the latter with either the rhenium component, the tin component, or both. The hydrosol, which is typically utilized to form the amorphous carrier material, may contain halogen and thus contribute at least a portion of the halogen component to the final composite. The quantity of halogen is such that the final catalytic composite contains about 0.1% to about 1.5% by weight, and preferably from about 0.5% to about 1.2% by weight, calculated on the basis of the elemental halogen.

When used in many of the hydrogen-consuming processes hereinbefore described, the foregoing quantities of metallic components will be combined with a carrier material of alumina and silica, wherein the silica concentration is 10.0% to about 90.0% by weight. In processes where the natural acid function of the catalytic composite must necessarily be attenuated, the metallic components will be combined with a carrier material consisting essentially of alumina. In this latter situation, a halogen component is often not combined with the catalytic composite, and the inherent acid function of the dual-function catalytically active metallic components is further attenuated through the addition of from 0.01% to about 1.5% by weight of an alkalinous metal component. One such process, in which the acid function of the catalyst must necessarily be attenuated, is the process wherein an aromatic hydrocarbon is hydrogenated to produce the corresponding cycloparaffin. Specifically, a benzene-concentrate is often used as the starting material for the production of cyclohexane, primarily to satisfy the demand thereof in the manufacture of nylon. In order to avoid ring-opening, which results in loss of both the benzene and the cyclohexane product, an alkalinous metal component is combined with the catalytic composite in an amount of from 0.01% to about 1.5% by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

Regarding the preferred amounts of the various metallic components of the catalyst, I have found it to be a good practice to specify the quantities of the rhenium component as a function of the amount of the tin component. On this basis, the amount of the rhenium component is ordinarily selected so the atomic ratio of rhenium to tin, contained in the composite is about 0.1:1 to about 3:1, with the preferred range being about 0.25:1 to about 2.0:1. Another significant parameter for the subject catalytic composite is the "total metals content" which is defined to be the sum of the rhenium component and the tin component, calculated on the basis of elemental tin and elemental rhenium. Good results are ordinarily obtained with the subject catalyst when this parameter is fixed at a value at about 0.02 to about 30.0% by weight, with the best results ordinarily achieved at a metals loading of about 0.2 to about 6.0% by weight.

Correlating the above discussion of each of the essential and preferred components of the subject catalytic composite, it is evident that a preferred catalytic composite comprises a combination of a porous carrier material, a rhenium component, a tin component and, more specifically, when desired or required, a halogen component in amounts sufficient to result in a composite containing about 0.1% to about 1.5% by weight of halogen, about 0.05 to about 3.0% by weight of rhenium and about 0.05 to about 5.0% by weight of tin. Accordingly, specific examples of suitable catalytic composites, containing halogen, are as follows: a composite of 0.5% by weight of tin, 0.5% by weight of rhenium and about 0.75% by weight of halogen; a composite of 0.1% by weight of tin, 0.1% by weight of rhenium and about 0.75% by weight of halogen; a composite of 0.375% by weight of tin, 0.375% by weight of rhenium and about 0.70% by weight of halogen; a catalytic composite comprising a combination of 1.0% by weight of tin, 1.0% by weight of rhenium and about 0.80% by weight of halogen; a composite of 2.0% by weight of tin, 1.0% by weight of rhenium and about 0.35% by weight of halogen; and, a composite comprising a combination of 5.0% by weight of tin, 3.0% by weight of rhenium and about 1.0% by weight of halogen. The amounts of the components are, of course, calculated as if the components existed as the element. In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component is chlorine, for example, it is preferred to use a mol ratio of water to hydrochloric acid to about 20:1 to about 100:1 during at least a portion of the calcination step in order to adjust the final chlorine content of the composite to a range of about 0.5 to about 1.2% by weight.

Prior to its use, in the hydroprocessing of hydrocarbons, the resultant calcined catalytic composite may be subjected to a substantially water-free reduction technique. This technique is designed to insure a more uniform and finely divided dispersion of the metallic components throughout the carrier material. Preferably, substantially pure and dry hydrogen (i.e. less than about 30.0 volume p.p.m. of water) is employed as the reducing agent. The calcined catalyst is contacted at a temperature of about 800° F. to about 1200° F., and for a period of about 0.5 to about 10 hours, or more, and effective to substantially reduce the metallic components. This reduction technique may be performed in situ as part of a start-up sequence provided precautions are observed to pre-dry the unit to a substantially water-free state, and if substantially water-free hydrogen is employed.

Again with respect to effecting hydrogen-consuming reactions, the process is generally improved when the reduced composite is subjected to a presulfiding operation designed to incorporate from about 0.05% to about 0.50% by weight of sulfur, on an elemental basis. This presulfiding treatment takes place in the presence of hydrogen and a suitable sulfur-containing compound including hydrogen sulfide, lower molecular weight mercaptans, organic sulfides, carbon disulfide, etc. This procedure involves treating the reduced catalyst with a sulfiding gas, such as a mixture of hydrogen and hydrogen sulfide having about 10 moles of hydrogen per mol of hydrogen sulfide, and at conditions sufficient to effect the desired incorporation of sulfur. These conditions include a temperature of from about 50° F. up to about 1100° F. It is generally considered a good practice to perform the presulfiding technique under substantially water-free conditions.

According to the present invention, a hydrocarbon charge stock and hydrogen are contacted with a catalyst of the type described above in a hydrocarbon conversion zone. As hereinafter indicated, the particular catalyst employed is dependent upon the characteristics of the charge stock as well as the desired end result. The contacting may be accomplished by using the catalyst in a fixed-bed system, a moving-bed system, a fluidized-bed system, or in a batch-type operation; however, in view of the risk of attrition loss of the catalyst, it is preferred to use the fixed-bed system. Furthermore, it is well known that a fixed-bed catalytic system offers many operational advantages. In this type of system, a hydrogen-rich gaseous phase and the charge stock are preheated by any suitable heating means to the desired reaction temperature, the mixture being passed into the conversion zone containing the fixed-bed of the catalytic composite. It is understood, of course, that the conversion zone may be one or more separate reactors having suitable means therebetween to insure that the desired conversion temperature is maintained at the entrance to each reactor. It should also be noted that the reactants may be contacted with the catalyst bed in either upward, downward or radial flow fashion, with the latter being preferred. Additionally, the reactants may be in the liquid phase, a mixed liquid-vapor phase or a vapor phase when they contact the catalyst.

The operating conditions imposed upon the reaction zones are dependent upon the particular hydroprocessing being effected. However, these operating conditions will include a pressure from about 500 to about 5,000 p.s.i.g., an LHSV (liquid hourly space velocity) of about 0.1 to about 10.0, and a hydrogen concentration within the range of about 3,000 to about 50,000 s.c.f./bbl. In view of the fact that the reactions being effected, while conducting a given process, are exothermic in nature, an increasing temperature gradient is experienced as the hydrogen and feed stock traverse the catalyst bed. For any given hydrogen-consuming process, it is desirable to maintain a maximum catalyst bed temperature below about 900° F., which temperature is virtually identical to that as conveniently measured at the outlet of the reaction zone. Hydrogen-consuming processes are conducted at a temperature within the range of about 200° F. to about 900° F., and it is intended herein that the stated temperature of operation aludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydro-treating processes encompassed by the present invention, especially where hydrocracking a heavy hydrocarbonaceous material to produce lower-boiling hydrocarbon products, that portion of the normally liquid product effluent boiling above the end point of the desired product will be recycled to combine with such hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other individual process details will be given in the following description of several of the hydroprocessing schemes to which the present invention is applicable. These will be presented by way of examples given in conjunction with commercially-scaled operating units.

EXAMPLES

In presenting these examples, it is not intended that the present invention be limited to the specific illustrations, nor is it intended that a given hydrotreating process be limited to the particular operating conditions, catalytic composites, processing techniques, charge stocks, etc. It is understood, therefore, that the present invention is merely illustrated by the specifics hereinafter set forth.

EXAMPLE I

In this example, the process of the present invention is illustrated as being applied to the hydrogenation of aromatic hydrocarbons such as benzene, toluene, the various xylenes, naphthalenes, etc., to form the corresponding cyclic paraffins. When applied to the hydrogenation of aromatic hydrocarbons which are contaminated by sulfurous compounds, and especially thiophenic compounds, the process is advantageous in that it affords 100.0% conversion without the necessity for the substantially complete and prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetradronaphthalene, etc., which find widespread use in a variety of commercial industries in the manufacture of nylon and as a solvent for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, as well as the naphthenes contained therein. Benzene is readily recovered from the selected solvent by way of distillation, and in a purity of 99.0%, or more. Heretofore, the hydrogenation of aromatic hydrocarbons, for example benzene, has been effected with a nickel-containing catalyst at hydrogenation conditions. This is extremely disadvantageous in many respects, and especially from the standpoint that nickel is quite sensitive to the minor quantity of sulfurous compounds which may be contained in the benzene concentrate. While some processes have proposed the use of a Group VIII nobel metal-containing catalyst, as hereinbefore set forth, this kind of principal ingredient is in relatively short supply and is extremely expensive. In accordance with the present process, the benzene is hydrogenated in contact with a non-acidic catalytic composite containing 0.05% to about 3.0% by weight of a rhenium component, from about 0.05% to about 5.0% by weight of a tin component and from about 0.01% to about 1.5% by weight of an alkalinous metal component. Operating conditions include a maximum catalyst bed temperature in the range of about 200° F. to about 800° F., a pressure of from 500 to about 2,000 p.s.i.g., a LHSV of from about 1.0 to about 10.0 and a hydrogen concentration in an amount sufficient to yield a mol ratio of hydrogen to cyclohexane in the product effluent from the last reaction zone, not substantially less than about 4.0:1. One operating technique involves the use of three reaction zones, each of which contains approximately one-third of the total quantity of the catalyst employed. The process is further facilitated when the total fresh benzene is added in three portions, preferably but not necessarily, approximately equal, one each to the inlet of each of the three reaction zones. While the benzene, therefore, passes in parallel flow through the reaction zones, the hydrogen and cyclohexane recycle pass in series flow through the reaction zones.

In the current example, the catalyst utilized is a substantially halogen-free alumina carrier material combined with about 0.5% by weight of tin, 0.375% by weight of rhenium and about 0.80% by weight of lithium, all of which are caculated on the basis of the elemental metals. The hydrogenation process will be described in connection with a commercially-scaled unit having a fresh benzene feed capacity of about 1,000 bbl./day. In the instant illustration, the total fresh benzene feed rate is about 721 bbl./day, of which 253 barrels is utilized to remove toluene from a make-up hydrogen stream in an absorber. The toluene-free make-up gas is then admixed with about 930 bbl./day of a cyclohexane-rich product recycle stream, the mixture being introduced into the first of a series of three reaction zones.

On a mols per hour basis, the total fresh benzene feed constitutes 119.25 mols per hour, of which about 42.5 mols per hour is utilized in the make-up gas absorber. This make-up gas, being introduced into the system from a hydrodealkylation process, contains about 6.33 mols per hour of benzene. The make-up gas from the absorber, being transmitted to the hydrogenation unit, and being combined, as above set forth, with a cyclohexane-rich product recycle, contains about 9.45 mols per hour of benzene. Of the 76.75 mols per hour of fresh benzene feed, about 24.80 mols per hour are introduced into the first reaction zone. Following suitable heat-exchange with various hot effluent streams, the total feed to the first reaction zone is at a temperature of 390° F. and a pressure of 450 p.s.i.g. The reaction zone effluent is at a temperature of 605° F. and a pressure of about 445 p.s.i.g. The total effluent from the first reaction zone is utilized as a heat-exchange medium, in a steam generator, whereby the temperature is reduced to a level of about 445° F. The cooled effluent is admixed with about 36.25 mols per hour of fresh benzene feed, at a temperature of 90° F., the resulting temperature being 390° F. The mixture enters the second reaction zone at a pressure of about 435 p.s.i.g. The second reaction zone effluent, at a pressure of 430 p.s.i.g. and a temperature of 600° F. is also utilized as a heat-exchange medium to generate steam whereby the temperature is reduced to a level of about 415° F. Upon being admixed with 15.70 mols per hour of fresh benzene feed, the temperature is again 390° F., and the mixture enters the third reaction zone at a pressure of about 420 p.s.i.g. The third reaction zone effluent is at a temperature of about 480° F. and a pressure of about 415 p.s.i.g. Again, through the utilization of the effluent as a heat-exchange medium, the temperature is reduced to a level of about 200° F., and subsequently reduced to a level of about 90° F., through the use of an air-cooled condenser. The cooled third reaction zone effluent is introduced into a high pressure separator, at a pressure of about 380 p.s.i.g.

A hydrogen-rich vaporous phase is withdrawn from the high pressure separator and is recycled by way of compressive means, at a pressure of about 450 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 250 p.s.i.g., a top temperature of about 160° F. and a bottom temperature of about 430° F. The cyclohexane product withdrawn from the stabilizer as a bottoms stream, the overhead stream being vented to fuel. The cyclohexane concentrate is recovered in an amount of about 84.12 mols per hour, of which only about 0.19 mols per hour constitutes other hexanes. In brief summation, of the 6,380 pounds per hour of fresh benzene feed (including about 514 pounds per hour in the make-up hydrogen stream), 7,075 pounds per hour of cyclohexane product is recovered.

EXAMPLE II

Another hydrocarbon hydroprocessing scheme, to which the present invention is applicable, involves the hydrorefining of coke-forming hydrocarbon distillates. These distillates are generally sulfurous in nature, and contain mono-olefinic, di-olefinic and aromatic hydrocarbons. Through the utilization of a catalytic composite comprising both a tin component and a rhenium component, increased selectivity and stability of operation is obtained; selectivity is most noticeable with respect to the retention of aromatic hydrocarbons, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which removed, enhance the value of the distillate fraction for further processing. Frequently, it is intended that these charge stocks be substantially desulfurized, saturated to the extent necessary to remove the conjugated di-olefins, while simultaneously retaining the aromatic hydrocarbons. When subjected to hydrotreating for the purpose of removing the contaminating influences, there is encountered difficulty in effecting the desired degree of reaction due to the formation of coke and other carbonaceous material.

As utilized herein, hydrogenating is intended to be synonymous with hydrorefining. The purpose is to provide a highly selective and stable process for hydrogenating coke-forming hydrocarbon distillates, and this is accomplished through the use of a fixed-bed catalytic reaction system utilizing a catalyst comprising a tin component and a rhenium component. There exist two separate, desirable routes for the treatment of coke-forming distillates, for example a pyrolysis naphtha by-product. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity afforded restricts the hydrogenation to produce mono-olefins, and, with respect to the styrenes, the hydrogenation is inhibited to produce alkylbenzenes without "ring" saturation. The selectivity is accomplished with a minimum of polymer formation either to "gums" or polymers of lower molecular weight which would necessitate a rerunning of the product effluent prior to blending to gasoline. Other advantages of restricting the hydrogenation of the conjugated di-olefins and styrenes include: lower hydrogen consumption, lower heat of reaction and a higher octane rating gasoline boiling range product. Also, the non-conjugated di-olefins, such as 1,5 normal hexadiene are not unusually offensive in suitably inhibited gasolines, in some locales, and will possibly not react in this first stage. Some fresh charge stocks are sufficiently low in mercaptan sulfur content that direct gasoline blending may be considered. Such considerations are generally applicable to foreign markets, particularly European, where olefinic and sulfur-containing gasolines have not become too critical. It must be noted that the sulfurous compounds and the mono-olefins, whether virgin, or products of di-olefin partial saturation, are unchanged in the single, or first-stage reaction zone. Where, however, the desired end result is aromatic hydrocarbon retention, intended for subsequent extraction, the two-stage route is required. The mono-olefins must be substantially saturated in the second-stage to facilitate aromatic extraction by way of currently practiced methods. Thus, the desired necessary hydrogenation involves saturation of the mono-olefins, as well as sulfur removal, the latter required for an acceptable ultimate aromatic product. Attendant upon this is the necessity to avoid even partial saturation of aromatic nuclei.

With respect to one preferred catalytic composite, its principal function involves the selective hydrogenation of conjugated di-olefinic hydrocarbons to mono-olefinic hydrocarbons. This particular catalytic composite possesses unusual stability notwithstanding the presence of sulfurous compounds in the fresh charge stock. The catalytic composite comprises an alumina-containing refractory inorganic oxide, a tin component, a rhenium component and an alkali metal component, the latter being preferably potassium and/or lithium. It is especially preferred, for use in this particular hydrocarbon hydroprocessing scheme, that the catalytic composite be substantially free from any "acid-acting" propensities. The catalytic composite, utilized in the second reaction zone, for the primary purpose of effecting the destructive conversion of sulfurous compounds into hydrogen sulfide and hydrocarbons, is a composite of an alumina-containing refractory inorganic oxide, a rhenium component and a tin component. Through the utilization of a particular sequence of processing steps, the use of the foregoing described catalytic composites inhibits the formation of high molecular weight polymers and co-polymers to a degree that permits processing for an extended period of time. Briefly, this is accomplished by initiating the hydrorefining reactions at temperatures below about 500° F., at which temperatures the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon charge stock, for example a light naphtha by-product from a commercial cracking unit designed and operated for the production of ethylene, having a gravity of about 40.0 API, a bromine number of about 45.7, a diene value of about 35.1 and containing about 400 p.p.m. by weight of sulfur and 73.0 vol. percent aromatic hydrocarbons, is admixed with recycled hydrogen. The hydrogen concentration is within the range of about 1,500 to about 10,000 s.c.f./bbl., and preferably in the ragne of from 1,500 to about 6,000 s.c.f./bbl. The charge stock is heated to a temperature in the range of from about 200° F. to about 500° F., and preferably to a temperature above about 300° F., by way of heat-exchange with various product effluent streams, and is introduced into the first reaction zone at an LHSV in the range of about 0.5 to about 10.0. The reaction one is maintained at a pressure of from 400 to about 1,000 p.s.i.g., and preferably at a level in the range of from 500 p.s.i.g. to about 900 p.s.i.g.

The temperature of the product effluent from the first reaction zone is increased to a level above about 500° F. and preferably in the range of about 500° F. to about 800° F. When the process is functioning efficiently, the diene value of the liquid charge entering the second catalytic reaction zone is less than about 1.0, and often less than about 0.5. The conversion of sulfurous compounds and nitrogenous compounds (where present in the charge stock), as well as the saturation of mono-olefins, contained within the first zone effluent, is effected in the second zone. The second catalytic reaction zone is maintained under an imposed pressure of from 400 to about 1,000 p.s.i.g., and preferably at a level of from about 500 to about 900 p.s.i.g. The two-stage process is facilitated when the focal point for pressure control is the high-pressure separator serving to separate the product effluent from the second catalytic reaction zone. It will, therefore, be maintained at a pressure slightly less than the first catalytic reaction zone as a result of fluid flow from the system. The LHSV through the second reaction zone is about 0.5 to about 10.0, based upon fresh feed only. The hydrogen concentration will be in a range of from 1,000 to about 10,000 s.c.f./bbl., and preferably from about 1,000 to about 8,000 s.c.f./bbl. Series-flow through the entire system is facilitated when the recycle hydrogen is admixed with the fresh hydrocarbon charge stock. Make-up hydrogen, to supplant that consumed in the overall process may be introduced from any suitable external source, but is preferably introduced into the system by way of the effluent line from the first catalytic reaction zone to the second catalytic reaction zone.

With respect to the naphtha boiling range portion of the product effluent, sulfur concentration is less than about 1.0 p.p.m., the aromatic concentration is about 72.2% by volume, the bromine number is less than about 0.5 and the diene value is essentially nil.

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is simply controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

A blend of the so-called pyrolysis naphthas, having a gravity of about 47.2 API, containing about 650 p.p.m. by weight of sulfur, about 75.4% by volume of aromatics, and having a bromine number of 95.8 and a diene value of 92.7, is initially processed in a first reaction zone containing a catalytic composite of alumina, 0.5% by weight of lithium 0.375% by weight of rhenium and 0.20% by weight of tin, calculated as the elements. The fresh feed charge rate is 8,535 bbl./day, and this is admixed with 30,725 bbl./day of a normally liquid diluent. Based upon fresh feed only, the LHSV is 1.1 and the hydrogen circulation rate is 4,600 s.c.f./bbl. The charge stock is raised to a temperature of about 340° F., and enters the first reaction zone under a pressure of about 775 p.s.i.g. The product effluent emanates from the first reaction zone at a pressure of about 765 p.s.i.g. and a temperature of about 440° F. The temperature of the first reaction zone product effluent is increased to a level of about 625° F., and is introduced into the second reaction zone under a pressure of about 750 p.s.i.g. The LHSV, exclusive of the recycle diluent, is 1.1 and the hydrogen circulation rate is about 6,900 s.c.f./bbl. The second reaction zone contains a catalyst of a composite of alumina, 0.375% by weight of rhenium and 0.20% by weight of tin. The reaction product effluent is introduced, following its use as the heat-exchange medium and further cooling to reduce its temperature to a level of about 110° F., into a high-pressure separator at a pressure of about 750 p.s.i.g. The normally liquid stream from the cold separator is introduced into a reboiled stripping column for hydrogen sulfide removal and depentanization. The hydrogen sulfide stripping column functions at conditions of temperature and pressure required to concentrate a $C_6$–$C_9$ aromatic stream as a bottoms fraction. With respect to the overall product distribution, only about 0.05% by weight of the charge results in light paraffinic hydrocarbons, 0.01% by weight of butanes and 0.02% by weight of pentanes, the remainder 101.87% by weight constitutes the aromatic concentrate; these results are achieved with a hydrogen consumption (in both stages of about 1,059 s.c.f./bbl. or about 2.02% by weight, the concentration of aromatics is about 74.5% by volume, the sulfur concentration is less than 1.0 p.p.m. by weight and the diene value is essentially "nil."

EXAMPLE III

This example is presented to illustrate still another hydrocarbon hydroprocessing scheme, specifically directed toward the improvement of the jet fuel characteristics of sulfurous, kerosene boiling range fractions. The improvement is especially noticeable in the IPT Smoke Point, the concentration of aromatic hydrocarbons and the concentration of sulfur. This is normally considered a two-stage process wherein desulfurization is effected in the first reaction zone at relatively mild severities which result in normally liquid product effluent containing from about 15 to about 35 p.p.m. of sulfur by weight. Aromatic saturation is the principal reaction effected in the second reaction zone, having disposed therein a catalytic composite of alumina, a halogen component, a rhenium component and a tin component.

Suitable charge stocks are kerosene fractions, including one having an initial boiling point as low as about 300° F., and an end boiling point as high as about 600° F. Exemplary of such kerosene fractions are those boiling from about 300° F. to about 550° F., from 330° F. to about 500° F., from 330° F. to about 530° F., etc. As a specific example, a kerosene obtained from hydrocracking a mid-continent slurry oil, having a gravity of about 30.5 API, an initial boiling point of about 388° F., an end boiling point of about 522° F., indicates an IPT Smoke Point of 17.1 mm., and contains 530 p.p.m. of sulfur and 24.8% by volume of aromatic hydrocarbons. Through the use of the catalytic process of the present invention, the improvement in the jet fuel quality of such a kerosene fraction is most significant with respect to raising the IPT Smoke Point, and reducing the concentration of sulfur in the quantity of aromatic hydrocarbons. Published specifications for the poorest quality of jet fuel, commonly referred to as Jet-A, Jet-Al and Jet B, call for a sulfur concentration of about 0.3% by weight maximum (3,000 p.p.m.), a minimum IPT Smoke Point of 25 mm. and a maximum aromatic concentration of about 20.0 volume percent.

In practicing the present invention, the charge stock is admixed with recycled hydrogen in an amount within the range of from about 1,000 to about 2,000 s.c.f./bbl. This mixture is heated to a temperature level necessary to control the maximum catalyst bed temperature below about 725° F., and preferably not above 700° F., with a lower catalyst bed temperature of about 600° F. The catalyst, containing about 2.2% by weight of cobalt and about 5.7% by weight of molybdenum, composited with alumina, is disposed in a reaction zone maintained under an imposed pressure in the range of from about 500 to about 1,100 p.s.i.g. The LHSV is in the range of about 0.5 to about 10.0, and preferably from about 0.5 to about 5.0. The total reaction product effluent from this first catalytic reaction zone is separated to provide a hydrogen-rich gaseous phase and a normaly liquid hydrocarbon stream containing from 15 p.p.m. to about 35 p.p.m. of sulfur by weight. The normally liquid phase portion of the first reaction zone effluent is utilized as a fresh feed charge stock to the second reaction zone. In this particular instance, the first reaction zone decreases the sulfur concentration to about 25 p.p.m., the aromatic concentration to about 16.3% by volume and has increased the IPT Smoke Point to a level of about 21.5 mm.

The catalytic composite within the second reaction zone comprises alumina, 0.30% by weight of rhenium, 0.25% by weight of tin and about 0.70% by weight of combined chloride, calculated on the basis of the elements. The reaction zone is maintained at a pressure of about 400 to about 1,500 p.s.i.g., and the hydrogen circulation rate is in the range of 1,500 to about 10,000 s.c.f./bbl. The LHSV is in the range of about 0.5 to about 5.0, and preferably from about 0.5 to about 3.0. It is preferred to limit the catalyst bed temperature in the second reaction zone to a maximum level of about 750° F. With a catalyst of these particular chemical and physical characteristics, optimum aromatic saturation, processing a feed stock containing from about 15 to about 35 p.p.m. of sulfur, is effected at maximum catalyst bed temperatures in the range of about 625° F. to about 750° F. With respect to the normally liquid kerosene fraction, recovered from the condensed liquid removed from the total product effluent, the sulfur concentration is effectively "nil," being about 0.1 p.p.m. The quantity of aromatic hydrocarbons has been decreased to a level of about 1.0% by volume, or less, and the IPT Smoke Point has been increased to above about 35.0 mm.

With respect to another kerosene fraction, having an IPT Smoke Point of about 20.7 mm., an aromatic concentration of about 19.5 vol. percent and a sulfur concentration of about 17 p.p.m. by weight, the same is processed in a catalytic reaction zone at a pressure of about 850 p.s.i.g. and a maximum catalyst bed temperature of about 725° F. The LHSV is about 1.1, and the hydrogen circulation rate is about 8,000 s.c.f./bbl. The catalytic composite disposed within the reaction zone comprises alumina, 0.375% by weight of rhenium, 0.35% by weight of tin and about 0.70% by weight of combined chloride. Following separation and distillation to concentrate the kerosene fraction, analyses indicate that the Smoke Point has been increased to a level of about 36.3 mm., the aromatic concentration has been lowered to about 0.75% by volume and the sulfur concentration is essentially "nil."

EXAMPLE IV

This illustration of a hydrocarbon hydroprocessing scheme encompassed by my invention is one which involves hydrocracking heavy hydrocarbonaceous material into lower-boiling hydrocarbon products. In this instance, the catalyst contains a rhenium component, a tin component, combined with a crystalline aluminosilicate carrier material, preferably faujasite, and still more preferably one which is at least 90.0% by weight zeolitic. In some instances, a halogen component may be combined with the carrier material, particularly fluorine and/or chlorine.

Most of the virgin stocks, intended for hydrocracking, are contaminated by sulfurous compounds and nitrogenous compounds, and, in the case of the heavier charge stocks, various metallic contaminants, insoluble asphalts, etc. Contaminated charge stocks are generally hydrotreated, or hydrorefined, in order to prepare a charge suitable for hydrocracking. Thus, the catalytic process of the present invention can be beneficially utilized as the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities of about 0.25 to about 10.0 will be suitable, the lower range generally reserved for the heavier stocks. The hydrogen circulation rate will be at least about 3,000 s.c.f./bbl., with an upper limit of about 50,000 s.c.f./bbl., based upon fresh feed. For the majority of feed stocks, hydrogen concentrations in the range of 5,000 to 20,000 s.c.f./bbl. will suffice. With respect to the LHSV, it is based upon fresh feed, notwithstanding the use of liquid recycle providing a combined liquid feed ratio in the range of about 1.1 to about 6.0. The operating temperature again alludes to the maximum temperature of the catalyst within the reaction zone, and is in the range of about 400° F. to about 900° F. Since the principal reactions are exothermic in nature, the increasing temperature gradient, experienced as the charge stock traverses the catalyst bed, results in an outlet temperature higher than that at the inlet to the catalyst bed. The maximum catalyst temperature should not exceed about 900° F., and a preferred technique is to limit the temperature increase to 100° F. or less.

Although amorphous composites of alumina and silica, containing from about 10.0% to about 90.0% by weight of the latter, are suitable for use in the catalytic composite employed in the hydroprocessing of hydrocarbons, a preferred carrier material constitutes a crystalline aluminosilicate, preferably faujasite, of which at least about 90.0% by weight is zeolitic. This carrier material, and a method of preparing the same, have hereinbefore been described. Generally, the tin component will be used in an amount sufficient to result in a final catalytic composite containing from 0.05% to about 5.0% by weight thereof. The rhenium component is present in an amount within the range of about 0.05% to about 3.0% by weight, and may exist within the composite as a compound such as an oxide, sulfide, halide, etc. Another possible constituent of the catalyst is a halogen component, either fluorine, chlorine, iodine, bromine, or mixtures thereof. Of these, it is preferred to utilize a catalyst containing fluorine and/or chlorine. The halogen component will be composited with the carrier material in such a manner as results in a final composite containing about 0.1% to about 1.5% by weight of halogen, calculated on an elemental basis.

A specific illustration of this hydrocarbon hydroprocessing technique involves the use of a catalytic composite of about 0.4% by weight of rhenium, 0.7% by weight of combined chloride, and 0.8% by weight of tin, combined with an amorphous alumina-silica carrier material containing 75.0% by weight of silica. This catalyst is intended for utilization in the processing of a diesel oil to produce maximum quantities of a JP-5 jet fuel having a boiling range of 310° F.–515° F. The diesel oil charge stock has a gravity of 37.0° API, an initial boiling point of about 460° F., a 50.0% volumetric distillation temperature of 524° F. and an end boiling point of 590° F. The charge stock contains 2,230 p.p.m. by weight of sulfur and 25 p.p.m. by weight of nitrogen, and is initially subjected to a clean-up operation at a maximum catalyst temperature of 750° F., which temperature represents an increasing temperature gradient of about 100° F. The pressure imposed upon the clean-up reaction zone is about 1,500 p.s.i.g., the hydrogen circulation rate is about 10,000 s.c.f./bbl., and the normally liquid charge stock contacts the catalyst at an LHSV of about 2.88.

This particular unit is designed to function in a series-flow fashion, and, therefore, the total product effluent from the clean-up reaction zone is introduced into the hydrocracking reaction zone. The pressure imposed upon the second reaction zone is slightly less than that imposed upon the clean-up reaction zone as a result of a pressure drop normally experienced due to fluid flow through the system. The maximum catalyst bed temperature is 720° F., representing a temperature increase of 20° F. which is controlled by hydrogen quench in an amount of 1,800 s.c.f./bbl. The LHSV, based upon fresh feed only, is 1.56, and the combined liquid feed ratio is 1.35 stemming from the recycle of 3,500 bbl./day of that portion of the hydrocracked product effluent boiling above a temperature of 515° F. Following separation of the product effluent from the hydrocracking reaction zone, to concentrate the desired jet fuel boiling range fraction, and to provide a hydrogen-rich recycle gas stream, the remaining 515° F.-plus normally liquid material, in an amount of 3,500 bbl./day, is recycled to the inlet of the hydrocracking reaction zone. In the following table, there is indicated the product yield and distribution of this illustrative process. With respect to the first reaction zone, the hydrogen consumption is 0.72% by weight of the fresh feed (397 s.c.f./bbl.) and for the hydrocracking reaction zone, 1.69% by weight, or 937 s.c.f./bbl.

TABLE I.—JET FUEL PRODUCT YIELD AND DISTRIBUTION

| Component | Weight percent | Volume percent |
|---|---|---|
| Ammonia | | |
| Hydrogen sulfide | 0.24 | |
| Methane | 0.30 | |
| Ethane | 0.28 | |
| Propane | 1.76 | |
| Butanes | 7.90 | 11.65 |
| Pentanes | 5.49 | 7.38 |
| Hexanes | 8.80 | 10.75 |
| Heptane: | | |
| 310° F | 24.17 | 27.08 |
| 310° F–515° F | 52.75 | 56.51 |

With respect to both the butane product and pentane product, the former is indicated as being about 70.0% iso-butanes, while the latter constitutes about 93.0 iso-pentanes. An analysis of the combined pentane/hexane fraction indicates a gravity of 82.2 API, a clear research octane rating of 83.2 and a leaded research octane rating of about 98.3; as such, this fraction constitutes an excellent blending component for motor fuel. The heptane-310° F. gasoline boiling fraction has a gravity of 57.3 API, and contains 44.0% by volume of paraffins, 48.0% by volume of naphthenes and 8.0% by volume of aromatics. This gasoline boiling range fraction constitutes an excellent charge stock for a catalytic reforming unit in order to improve the motor fuel characteristics thereof.

The jet fuel fraction, 310° F.–515° F., has a gravity of 49.0 API, contains about 8.5% by volume of aromatics, and has an IPT Smoke Point of 25.0 mm. and a freeze point of —55° F.; the sulfur concentration is less than 0.1 p.p.m.

EXAMPLE V

This example is presented to illustrate the use of the novel crystalline aluminosilicate catalyst for hydrocracking a multiplicity of feed stocks to produce a varied product slate. The catalyst is a composite of 0.75% by weight of combined chloride, 0.75% by weight of rhenium and 3.75% by weight of tin, combined with a faujasitic crystalline aluminosilicate carrier material, of which 91.9% by weight is zeolitic. In this particular process, a straight run vacuum gas oil, having a gravity of 23.8

API and containing 2.37% by weight of sulfur and 720 p.p.m. by weight of nitrogen, in an amount of 8,900 bbl./day, is blended with 2,270 bbl./day of a propane deasphalted oil having a gravity of 19.8 API and containing 2.50% by weight of sulfur and 1,450 p.p.m. by weight of nitrogen. The blended charge stock is processed in a clean-up operation at a pressure of 2,500 p.s.i.g., a maximum catalyst bed temperature of 875° F. and at an LHSV of 0.67 (based on fresh feed only). The hydrogen circulation rate is 8,000 s.c.f./bbl., and 4,200 s.c.f./bbl. of a hydrogen quench stream is utilized to maintain the increasing temperature gradient at about 50° F.

The desired varied product slate is (1) maximum LPG (liquefied petroleum gas) of the propane/butane type, (2) maximum quantities of a heptane-400° F. end boiling point gasoline, (3) from about 7.0% to about 10.0% by volume of a waxy lube oil and, (4) 10.0% to 20.0% of a diesel fuel. The total product effluent from the clean-up reaction zone is introduced into a high-pressure separator for the purpose of providing a hydrogen-rich recycle gas stream and a normally liquid hydrocarbon phase. The latter is admixed with the product effluent from the hydrocracking reaction zone, as hereafter described, and the mixture is subjected to fractionation to recover the desired product slate. A portion of the mixture boiling above a temperature of 700° F. is recycled to combine with the blended charge stock to provide a combined liquid feed ratio to the clean-up reaction zone of about 1.1. Another portion of the 700° F.-plus fraction is introduced into a vacuum column for the purpose of recovering the waxy lube and to remove an asphaltic residium from the unit.

That portion of the normally liquid product effluent, from the blend of the clean-up and hydrocracking effluent, boiling above about 400° F., is utilized as the charge to the hydrocracking reaction zone. Prior to being introduced thereto, however, the charge is admixed with a straight-run hexane fraction in an amount of 860 bbl./day, a straight-run naphtha fraction in an amount of 3,370 bbl./day and a straight-run kerosene fraction in an amount of 3,770 bbl./day. The total "fresh" feed to the hydrocracking reaction zone is in an amount of 11,556 bbl./day; this is admixed with 4,391 bbl./day of a recycle diluent stream boiling from 410° F. to about 600° F., to yield a combined liquid feed ratio to the hydrocracking reaction zone of 1.38. Based upon fresh feed only, the LHSV is 0.77, and the hydrogen circulation rate is 7,000 s.c.f./bbl. The reaction zone is maintained at a pressure of about 1,500 p.s.i.g., and the maximum catalyst bed temperature is 800° F., with the temperature gradient increase being maintained at 50° F. through the utilization of 5,100 s.c.f./bbl. of hydrogen quench. The total effluent from the hydrocracking reaction zone is introduced into a high-pressure separator to provide a hydrogen-rich recycle gas stream and a normally liquid hydrocracked product. As hereinbefore set forth, the hydrocracked product is admixed with the normally liquid product from the clean-up reaction zone, and the mixture is subjected to fractionation to provide the various product streams and recycle diluent streams.

In the following Table II, the product yield and distribution is presented with respect to the clean-up reaction zone (Stage I) and the hydrocracking reaction zone (Stage II), along with the overall yield and distribution. The values are given in weight percent for ammonia, hydrogen sulfide, methane and ethane, and in volume percent for propane and higher boiling hydrocarbons.

TABLE II.—HYDROCRACKING PRODUCT YIELD AND DISTRIBUTION

| Component | Stage I | Stage II | Total |
|---|---|---|---|
| Ammonia | 0.07 | | 0.07 |
| Hydrogen sulfide | 1.60 | 0.05 | 1.65 |
| Methane | 0.17 | 0.21 | 0.38 |
| Ethane | 0.29 | 0.59 | 0.88 |
| Propane | 0.97 | 13.27 | 14.24 |
| Butanes | 1.75 | 22.22 | 23.97 |
| Pentanes | 1.26 | 11.46 | 12.72 |
| Hexanes | 1.46 | 4.84 | 6.30 |
| Heptane: | | | |
| 400° F. | 17.26 | 23.26 | 40.52 |
| 400° F.-550° F. | 17.06 | | |
| 550° F.-700° F.[1] | 17.45 | | 15.96 |
| Waxy Lube | 9.06 | | 9.06 |

[1] Diesel oil.

The foregoing specification, and particularly the examples, indicates the method by which the present invention is effected, and the benefits afforded through the utilization thereof in hydrocarbon hydroprocessing.

I claim as my invention:

1. A process for hydrocracking a hydrocarbonaceous charge stock into lower molecular weight hydrocarbons which comprises reacting said charge stock with hydrogen, at a temperature of about 400° F. to 900° F., a pressure of about 800 to 5000 p.s.i.g., a liquid hourly space velocity of about 0.25 to 10.0 and a hydrogen concentration of about 3000 to 50,000 s.c.f./bbl., in contact with a catalytic composite of from 0.05 to about 3.0 wt. percent of a rhenium component, from 0.05 to about 5.0 wt. percent of a tin component, and a porous carrier material, said weight percentages being on an elemental basis.

2. The process of claim 1 further characterized in that said catalytic composite is reduced and sulfided prior to contacting said charge stock.

3. The process of claim 1 further characterized in that said catalytic composite also contains from about 0.1% to about 1.5% by weight of a halogen component, on an elemental basis.

4. The process of claim 2 further characterized in that said carrier material is a crystalline aluminosilicate.

5. The process of claim 2 further characterized in that said carrier material is an amorphous refractory inorganic oxide.

6. The process of claim 4 further characterized in that said crystalline aluminosilicate carrier material comprises faujasite.

7. A catalytic composite comprising a substantially pure crystalline aluminosilicate carrier material, at least about 90.0% by weight of which is zeolitic, about 0.05 to about 3.0 wt. percent of a rhenium component, and about 0.05 to about 5.0 wt. percent of a tin component, on an elemental basis.

8. The catalyst of claim 7 further characterized in that said crystalline aluminosilicate is faujasite.

References Cited

UNITED STATES PATENTS

| | | | |
|---|---|---|---|
| 3,318,802 | 5/1967 | Martin | 208—111 |
| 3,431,218 | 3/1969 | Plank et al. | 252—455 |
| 3,449,237 | 6/1969 | Jacobson et al. | 208—138 |
| 3,487,007 | 12/1969 | Mulaskey | 208—111 |

DELBERT E. GANTZ, Primary Examiner

R. M. BRUSKIN, Assistant Examiner

U.S. Cl. X.R.

252—461; 208—57, 89; 260—667